United States Patent
Herlem et al.

(10) Patent No.: US 10,556,501 B2
(45) Date of Patent: Feb. 11, 2020

(54) DEVICE FOR SEALING THE FRONT-END AIR INTAKE OF A MOTOR VEHICLE AND METHOD FOR MANUFACTURING SAME

(71) Applicant: Valeo Systemes Thermiques, Le Mesnil Saint Denis (FR)

(72) Inventors: Jean-Paul Herlem, Le Mesnil Saint Denis (FR); Jean-Nicolas Guyomard, Le Mesnil Saint Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 0 days.

(21) Appl. No.: 16/074,616

(22) PCT Filed: Feb. 1, 2017

(86) PCT No.: PCT/FR2017/050218
§ 371 (c)(1),
(2) Date: Aug. 1, 2018

(87) PCT Pub. No.: WO2017/134381
PCT Pub. Date: Aug. 10, 2017

(65) Prior Publication Data
US 2019/0039452 A1    Feb. 7, 2019

(30) Foreign Application Priority Data

Feb. 3, 2016   (FR) ..................................... 16 50851

(51) Int. Cl.
*B60K 11/08* (2006.01)

(52) U.S. Cl.
CPC ......... *B60K 11/085* (2013.01); *B60Y 2304/07* (2013.01); *B60Y 2410/113* (2013.01); *B60Y 2410/115* (2013.01)

(58) Field of Classification Search
CPC . B60K 11/085; Y02T 10/88; B60Y 2410/115; B60Y 2304/07; B60Y 2410/113
See application file for complete search history.

(56) References Cited

U.S. PATENT DOCUMENTS 3,226,025 A * 12/1965 Ferris ................... B60K 11/085
                                                         200/47
3,759,054 A *  9/1973 Graber ................. B60H 1/3227
                                                          62/183

(Continued)

FOREIGN PATENT DOCUMENTS

DE   10 2013 213136 A1   1/2015
EP        1 785 292 A1   5/2007

(Continued)

OTHER PUBLICATIONS

International Search Report issued in PCT/FR2017/050218 dated May 2, 2017 (2 pages).

(Continued)

*Primary Examiner* — Jacob B Meyer
(74) *Attorney, Agent, or Firm* — Osha Liang LLP

(57) ABSTRACT

The present invention relates to a sealing device (1) for the front-end air intake of a motor vehicle, including: a supporting frame (5) comprising two longitudinal crossmembers (5a), parallel to one another, and two side posts (5b), perpendicular to said longitudinal crossmembers (5a) and connecting said longitudinal crossmembers (5a); at least one flap (3), pivotably mounted about an axis (A) for pivoting between a sealing position and an open position, said at least one flap (3) being installed within the supporting frame (5); at least one electric control element (13) that controls the positioning of the flap(s) (3) and is capable of being connected to the electric system of the motor vehicle by at least one electricity supply cable (20), the supporting frame (5) comprising at least one device (15) for snap-fit attachment of (Continued)

Figure 1:
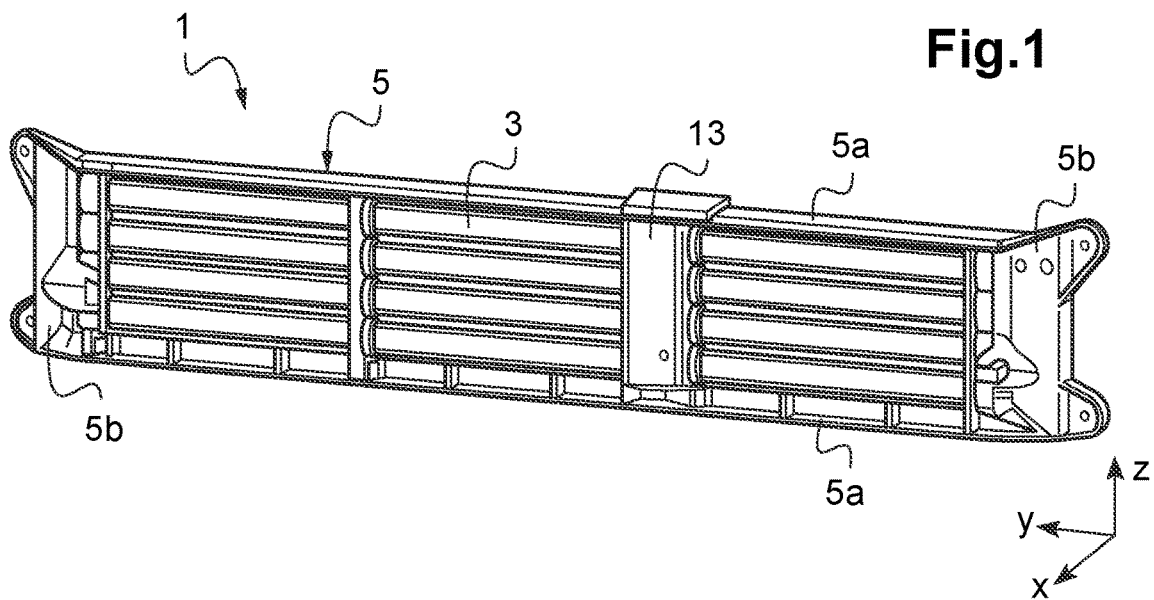

the electricity supply cable(s) (20), said snap-fit device (15) being integral with said supporting frame (5).

12 Claims, 3 Drawing Sheets

(56) References Cited

U.S. PATENT DOCUMENTS

| | | | | |
|---|---|---|---|---|
| 3,759,056 | A * | 9/1973 | Graber | B60H 1/3227 62/183 |
| 6,422,643 | B1 * | 7/2002 | Pease | B60R 19/52 24/297 |
| 7,866,737 | B2 * | 1/2011 | Browne | F24F 13/1426 296/193.1 |
| 8,161,919 | B2 * | 4/2012 | Klotz | B60K 11/085 123/41.04 |
| 8,444,215 | B2 * | 5/2013 | Bernt | B60K 11/085 296/193.1 |
| 8,544,581 | B2 * | 10/2013 | Stokes | B60R 19/48 180/68.1 |
| 8,646,552 | B2 * | 2/2014 | Evans | B60K 11/085 180/68.1 |
| 9,110,896 | B2 * | 8/2015 | Jeong | G06F 11/30 |
| 9,168,828 | B2 * | 10/2015 | Bourqui | F16H 19/08 |
| 9,333,850 | B2 * | 5/2016 | Ruppert | B60R 19/52 |
| 9,676,269 | B2 * | 6/2017 | Jeong | B60K 11/04 |
| 9,694,669 | B2 * | 7/2017 | Ruppert | B60K 11/085 |
| 9,931,926 | B2 * | 4/2018 | Cosmo | B60R 19/52 |
| 10,202,034 | B2 * | 2/2019 | Ruppert | B60K 11/085 |
| 10,207,578 | B2 * | 2/2019 | Cosmo | B60R 19/52 |
| 2010/0139583 | A1 * | 6/2010 | Klotz | B60K 11/085 123/41.04 |
| 2011/0005851 | A1 * | 1/2011 | Doroghazi | B60K 11/085 180/68.1 |
| 2012/0074730 | A1 * | 3/2012 | Bernt | B60K 11/085 296/193.1 |
| 2017/0129326 | A1 * | 5/2017 | Crane | B60K 11/085 |
| 2018/0118017 | A1 * | 5/2018 | Vacca | B60K 11/085 |
| 2018/0134146 | A1 * | 5/2018 | Vacca | B60K 11/085 |
| 2019/0039452 | A1 * | 2/2019 | Herlem | B60K 11/085 |
| 2019/0184813 | A1 * | 6/2019 | Lindberg | B60K 11/085 |

FOREIGN PATENT DOCUMENTS

| | | | |
|---|---|---|---|
| FR | 520 722 A | 6/1921 | |
| FR | 3052402 A1 * | 12/2017 | B60K 11/085 |

OTHER PUBLICATIONS

Written Opinion of the International Searching Authority issued in PCT/FR2017/050218 dated May 2, 2017 (5 pages).

* cited by examiner

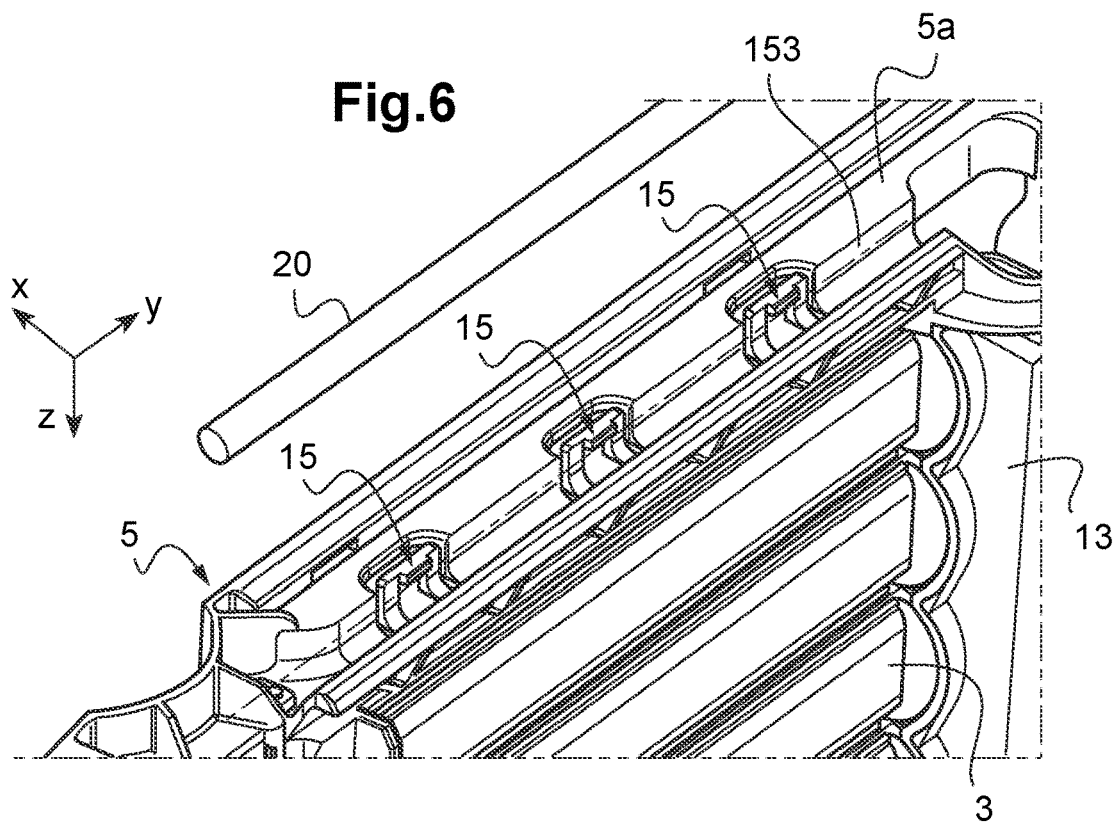
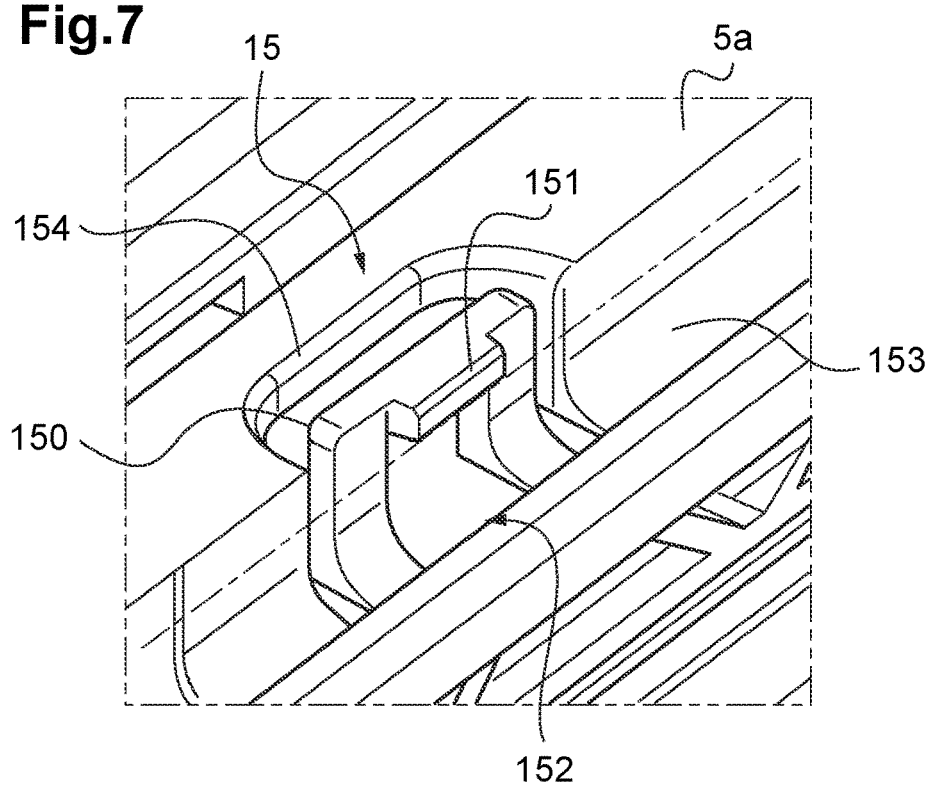

DEVICE FOR SEALING THE FRONT-END AIR INTAKE OF A MOTOR VEHICLE AND METHOD FOR MANUFACTURING SAME

The present invention concerns sealing devices and, more specifically, a device for sealing the front-end air inlet of a motor vehicle and the method for manufacturing same.

A motor vehicle front end generally consists of two main air inlets referred to as the upper channel and the lower channel, separated by a bumper beam. Generally, the heat exchangers of the motor vehicle, such as, for example, that used for the passenger compartment air conditioning or indeed that used to cool the engine, are positioned behind this bumper beam.

Arranging, in the air flow path passing through the main air inlets, more generally the lower channel, a supporting frame comprising a plurality of flaps mounted pivotably about parallel axes and suitable for assuming a plurality of different angular positions, between an open position and a sealing position, under the action of suitable of control means, is also known.

In this way, a sealing device is obtained that is similar to a slatted blind and allows the flow rate of air passing through the air inlets and arriving at the heat exchangers to be adjusted. It is thus possible to optimize the effectiveness of these heat exchangers depending on the requirements and by varying the quantity of air that they receive. Additionally, at high speeds, when in the sealing position, the flaps help reduce the drag coefficient of the vehicle and thus improve the aerodynamic properties of said vehicle.

The device, which allows the flaps to be shifted from a sealing position to an open position, generally comprises an actuator, that is most usually electric, and that pivots the flaps synchronously by means of a control rod.

In order to power the actuator, electric wiring needs to be included in the sealing device. In a known manner, said electric wiring is fastened to the supporting frame by means of removable clips that are installed during the assembly of the sealing device.

However, fastening the electric wiring in this way results in higher production costs because it requires a step of installing the removable clips, which is carried out manually.

One of the aims of the present invention is therefore to at least partially overcome the problems of the prior art and propose an improved sealing device and the method for manufacturing same.

The present invention therefore concerns a sealing device for the front-end air inlet of a motor vehicle, comprising:
- a supporting frame comprising two longitudinal crossmembers parallel to one another and two side posts perpendicular to said longitudinal crossmembers and connecting said longitudinal crossmembers,
- at least one flap mounted pivotably about a pivot axis between a sealing position and an open position, said at least one flap being installed within the supporting frame,
- at least one electric control element that controls the positioning of the flap or flaps and is suitable for being connected to the electric system of the motor vehicle by at least one power supply cable,
the supporting frame comprising at least one snap-fit attachment device for attaching the power supply cable or cables, said snap-fit device being integral with said supporting frame.

The fact that the supporting frame directly comprises at least one snap-fit attachment device and that the latter is directly integral with said supporting frame helps, in particular, save time during the process of manufacturing the sealing device, by avoiding a step of installing means for attaching the power supply cables. The operator has only to insert the power supply cables into the snap-fit attachment devices and connect said power supply cables to the control element in order to complete the assembly of the sealing device before it is installed on the motor vehicle. It is therefore possible to deliver, directly to the motor vehicle manufacturer, a sealing device that is already wired and does not require a complicated step of mounting on the motor vehicle.

According to one aspect of the invention, at least one of said side posts comprises at least one snap-fit attachment device.

According to another aspect of the invention, the snap-fit attachment device or devices are arranged on the rear face of at least one side post.

According to another aspect of the invention, at least one of said longitudinal crossmembers comprises at least one snap-fit attachment device.

According to another aspect of the invention, the lower longitudinal crossmember comprises at least one snap-fit attachment device.

According to another aspect of the invention, at least one snap-fit attachment device comprises two elastic tabs positioned opposite one another and between which the power supply cable or cables are able to be housed, the ends of said elastic tabs being separated by a distance smaller than the diameter of the power supply cable or cables so as to partially cover said power supply cable or cables.

According to another aspect of the invention, at least one snap-fit attachment device comprises:
- an elastic tab, and
- a rigid wall positioned opposite said elastic tab,
- said elastic tab comprising, at the end of same, a hook, said hook extending between the elastic tab and said rigid wall.

According to another aspect of the invention, said supporting frame comprises at least one groove into which the power supply cable or cables pass.

According to another aspect of the invention, one of the walls of the groove comprises at least one recess inside which the elastic tab is positioned, the rigid wall positioned opposite said elastic tab being the opposing wall of said groove.

The present invention also concerns a method for manufacturing a sealing device for the front-end air inlet of a motor vehicle, comprising:
- a supporting frame comprising two longitudinal crossmembers parallel to one another and two side posts perpendicular to said longitudinal crossmembers and connecting said longitudinal crossmembers,
- at least one flap mounted pivotably about a pivot axis between a sealing position and an open position, said at least one flap being installed within the supporting frame,
- at least one electric control element that controls the positioning of the flap or flaps and is suitable for being connected to the electric system of the motor vehicle by at least one power supply cable,
said manufacturing method comprising the following steps:
- manufacturing the supporting frame, said supporting frame comprising at least one snap-fit attachment device for attaching the power supply cable or cables, said snap-fit attachment device being integral with said supporting frame, installing the flap or flaps and the control element or elements on the supporting frame, connecting the power supply cable or cables to the control elements and attaching said power supply cable or cables to said snap-fit attachment devices.

According to one aspect of the manufacturing method, the supporting frame is produced from plastic material and the step of manufacturing the supporting frame is a molding step.

Figure 2:
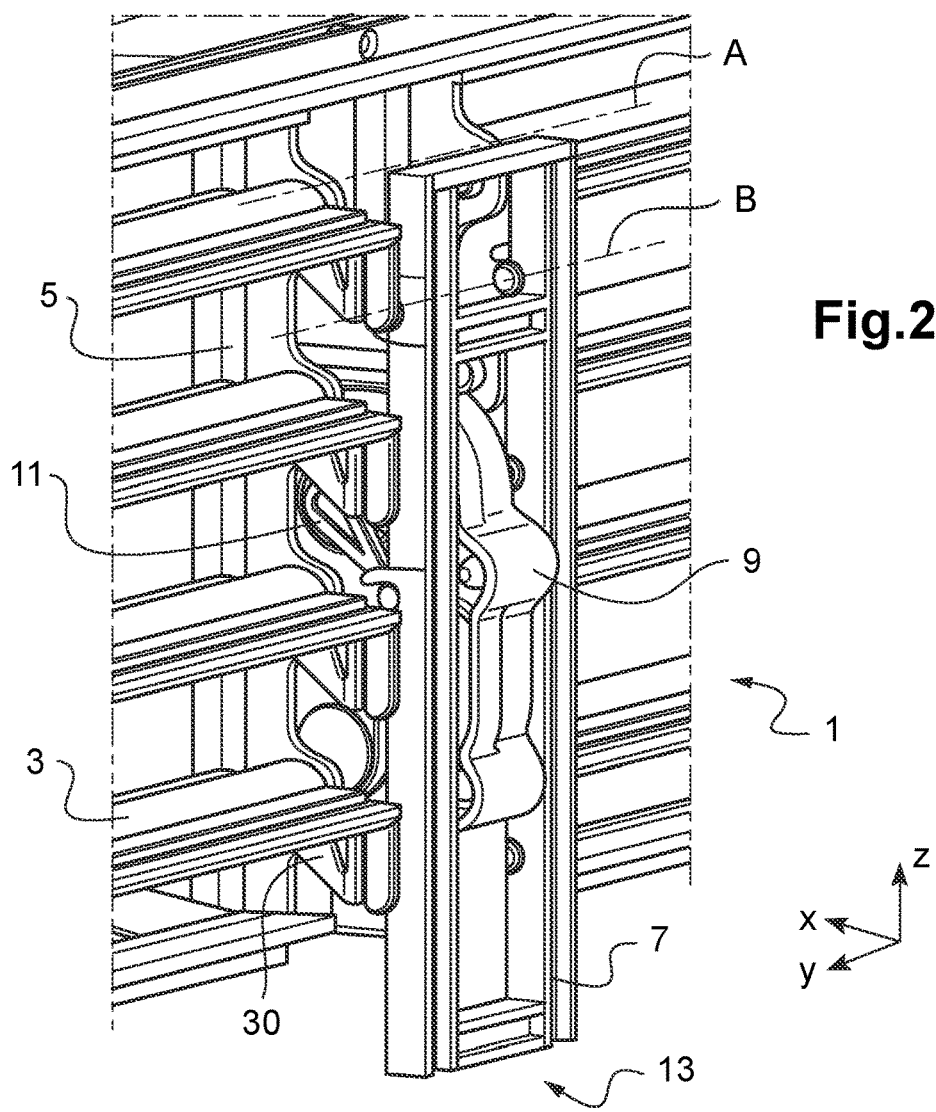
Figure 3:
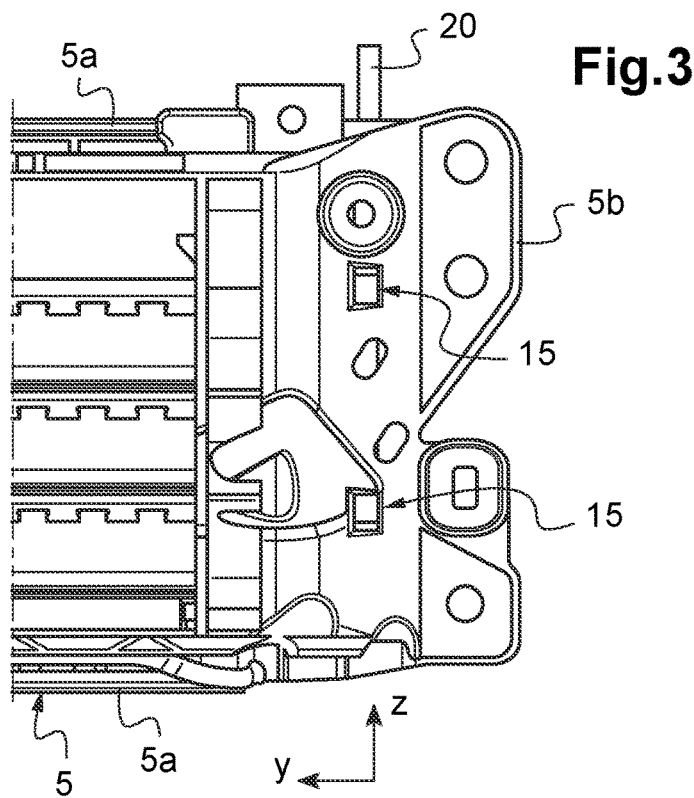
Figure 4:
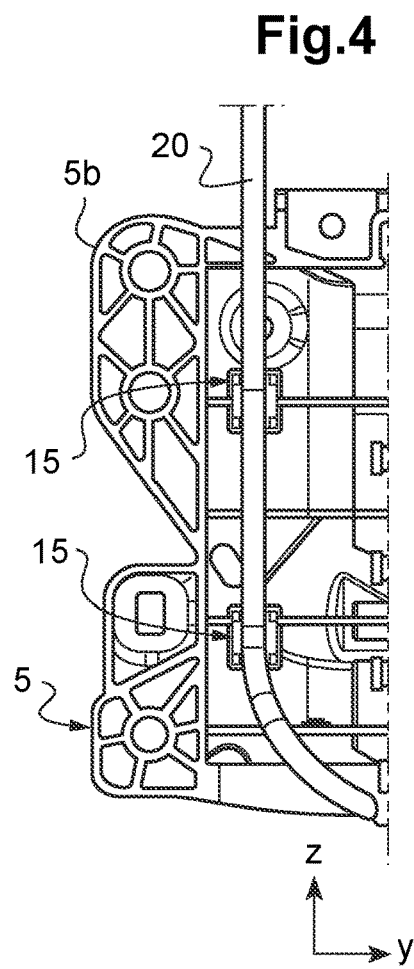
Figure 5:
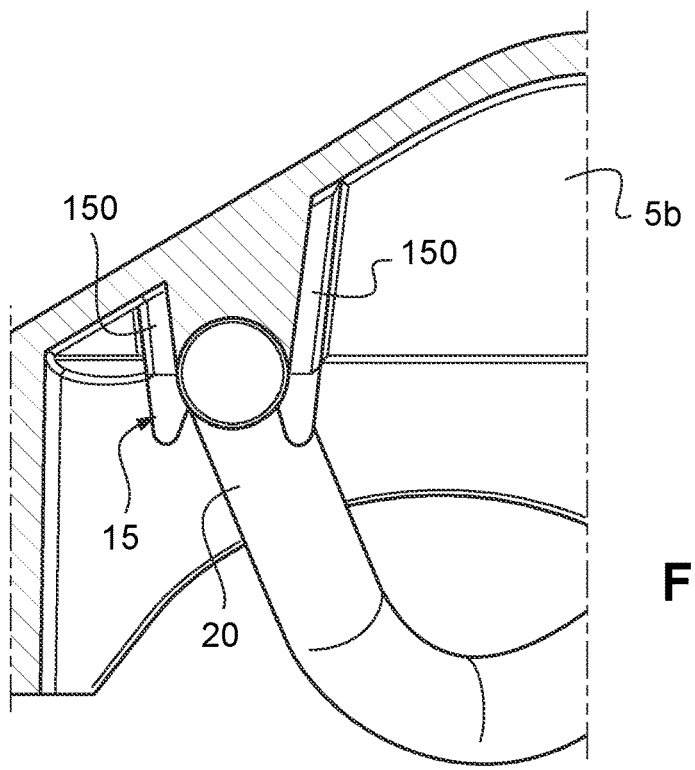

Other features and advantages of the invention will become clearer on reading the description that follows, provided as an illustrative and non-limiting example, and viewing the appended drawings in which:

FIG. 1 shows a front schematic perspective view of a sealing device in the sealing position, FIG. 2 shows a schematic perspective view of a control element, FIG. 3 shows a schematic view of the front face of a side post of a sealing device, FIG. 4 shows a schematic view of the rear face of the side post of FIG. 3, FIG. 5 shows a schematic view of a snap-fit attachment device according to a first embodiment, FIG. 6 shows a schematic view of a longitudinal cross-member, FIG. 7 shows a schematic view of a snap-fit attachment device according to a second embodiment.

The elements that are identical in the different figures have been given the same reference numbers.

The following embodiments are examples. Although the description refers to one or more embodiments, this does not necessarily mean that each reference concerns the same embodiment, or that the features apply only to a single embodiment. Single features of different embodiments may also be combined or interchanged to provide other embodiments.

A trihedron (X, Y, Z) is used in the different figures in order to show the viewing angle of each of said figures relative to each other. The axes of this trihedron can also correspond to the different orientations of the motor vehicle. The axis X can thus correspond to the length axis of the vehicle, the axis Y to its width axis and the axis Z to its height axis.

FIG. 1 shows a schematic perspective view of a sealing device in the sealing position. More specifically, this FIG. 1 shows the front face of said sealing device 1, i.e. the face turned towards the outside of the motor vehicle.

Said sealing device 1 comprises a supporting frame 5 comprising, in particular, two longitudinal crossmembers 5a, extending parallel to the axis Y of the trihedron, and at least two side posts 5b, extending parallel to the axis Z of the trihedron, and connecting said longitudinal crossmembers 5a. Advantageously, the supporting frame 5 is produced from plastic material, and the two longitudinal crossmembers 5a and the at least two side posts 5b are molded. In order to improve the rigidity of said supporting frame 5, it can be molded as a single part.

The flap or flaps 3 are installed inside said supporting frame 5. When there is a plurality of flaps 3, the latter form rows of flaps 3 that are parallel to each other and form a flap 3 unit. A control element 13 is positioned at one end of the flap 3 or flap 3 unit, allowing the flap or flaps 3 to rotate about a pivot axis A, between an open position (not shown), in which the flap or flaps 3 are arranged such that an air flow can pass through the sealing device 1, in particular within the supporting frame 5, and a sealing position shown in FIG. 1, in which the flap or flaps 3 are arranged such that an air flow cannot pass through the sealing device 1.

As shown in FIG. 1, a sealing device 1 of a front-end air inlet of a motor vehicle can comprise several flap 3 units extending over the entire width of the supporting frame 5. The flap 3 units can be separated by a control element 13 in order to ensure they rotate in a synchronous manner.

As shown in FIG. 2, the control element 13 comprises, in particular, a control rod 7. The flap or flaps 3 comprise a control arm 30, perpendicular to the pivot axis A of same and carrying a connection axis B. The pivot axis A and the connection axes B are all parallel to the axis Y of the trihedron. Said control arm 30 is generally integral with said flaps 3.

The control element 13 also comprises an actuator 9. The actuator 9 can, in particular, be an electric motor that applies a translational movement to the rod 7, along the axis Z of the trihedron, by rotating a lever 11. The actuator 9 is electrically connected to a power source (battery and/or alternator) of the vehicle by power supply cables 20 (shown in FIGS. 3 to 6).

The flaps 3 can each pivot about a pivot axis A defined by their connection with the supporting frame 5. The connection axes B connecting the flaps 3 and the control rod 7 are offset relative to the pivot axes A such that a translational movement of the control rod 7, parallel to the axis Z of the trihedron, under the action of the actuator 9, pivots the flaps 3 about their respective pivot axes A and therefore shifts said flaps 3 from one position to another.

Since all the flaps 3 are connected to the same rod 7, all of said flaps 3 shift from an open position to a sealing position synchronously. It is also possible for the unit to comprise only a single flap 3.

As shown in FIGS. 3 to 7, the supporting frame 5 comprises at least one snap-fit attachment device 15 for attaching the power supply cable or cables 20. This snap-fit device 15 is integral with the supporting frame 5.

The fact that the supporting frame 5 directly comprises at least one snap-fit attachment device 15 and that the latter is directly integral with said supporting frame 5 helps, in particular, save time during the process of manufacturing the sealing device 1, by avoiding a step of installing means for attaching the power supply cables 20. The operator has only to insert the power supply cables 20 into the snap-fit attachment devices 15 and connect said power supply cables 20 to the control element 13 in order to complete the assembly of the sealing device 1 before it is installed on the motor vehicle. It is therefore possible to deliver, directly to the motor vehicle manufacturer, a sealing device 1 that is already wired and does not require a complicated step of mounting on the motor vehicle.

As shown in FIGS. 3 and 4, the snap-fit attachment device or devices 15 can be arranged on at least one of the side posts 5b. FIG. 3 more specifically shows the front face of a sealing device 1 and FIG. 4 more specifically shows the rear face of a sealing device 1. The front face of a sealing device 1 should be taken to mean the face of said sealing device 1 intended to be turned towards the front of the motor vehicle and, similarly, the rear face of a sealing device 1 should be taken to mean the face of said sealing device 1 intended to be turned towards the rear of the motor vehicle.

Preferably, the snap-fit attachment device or devices 15 can be arranged on the rear face of the side posts 5b so as to be protected from the external conditions. Indeed, in this position, the supporting frame 5, and in particular the side post 5b on which the snap-fit attachment devices 15 are arranged, acts as a shield providing protection against external elements such as rain and wind, which could damage the power supply cable or cables 20.

According to a first embodiment shown in FIG. 5, the snap-fit attachment device or devices 15 can comprise two elastic tabs 150 positioned opposite one another, between which the power supply cable or cables 20 are able to be housed. The ends of the elastic tabs 150 are separated by a distance smaller than the diameter of the power supply cable or cables 20 so as to partially cover the latter. The power supply cable or cables 20 are therefore installed simply by positioning the latter at the space between said elastic tabs 150 and pushing the power supply cable or cables 20 between said elastic tabs 150 so as to move them apart from each other and allow the power supply cable or cables 20 to be inserted between said elastic tabs 150. Such a snap-fit attachment device 15 therefore allows the power supply cable or cables 20 to be attached simply and quickly.

The snap-fit attachment device or devices 15 can also be arranged on at least one of said longitudinal crossmembers 5a, as shown in FIG. 6. Preferably, the snap-fit attachment device or devices 15 can be arranged on the lower longitudinal crossmember 5a. Lower longitudinal crossmember 5a should be taken to mean the longitudinal crossmember 5a that is closest to the ground when the sealing device 1 is mounted on the motor vehicle. In FIG. 6, the sealing device 1 has been turned upside down to show said lower longitudinal crossmember 5a in greater detail. Preferably, the snap-fit attachment device or devices 15 are arranged on the side of the lower longitudinal crossmember 5a that faces the ground. The fact that the snap-fit attachment device or devices 15 are arranged on the lower longitudinal crossmember 5a also helps protect them against external elements such as rainwater, which may run down the sealing device 1.

According to a second embodiment shown in FIG. 7, the snap-fit attachment device 15 can comprise:
an elastic tab 150, and
a rigid wall 152 positioned opposite said elastic tab 150, The elastic tab 150 comprises a hook 151 at the end of same. This hook 151 extends between the elastic tab 150 and said rigid wall 152 so as to hold the power supply cable or cables 20. The power supply cable or cables 20 are therefore installed simply by positioning the latter at the space between the elastic tab 150 and the rigid wall 152 and by pushing the power supply cable or cables 20 so as to move the elastic tab 150 and the rigid wall 152 apart and allow the power supply cable or cables 20 to be inserted between the latter. The hook 151 holds the power supply cable or cables 20 between the elastic tab 150 and the rigid wall 152. Such a snap-fit attachment device 15 therefore allows the power supply cable or cables 20 to be attached simply and quickly.

As shown in FIGS. 6 and 7, the supporting frame 5, and more specifically the longitudinal crossmember 5a comprising the snap-fit attachment device or devices 15, comprises at least one groove 153 into which the power supply cable or cables 20 pass. The groove 153 is preferably parallel to the longitudinal axis of the longitudinal crossmember 5a and is therefore parallel to the axis Y of the trihedron. This groove 153 provides good protection for the power supply cable or cables 20 and also helps conceal them, ensuring they do not occupy space and are not excessively exposed. Preferably, the groove 153 is arranged on the side of the lower longitudinal crossmember 5a that faces the ground.

The groove 153 can thus comprise at least one recess 154 inside which the elastic tab 150 is positioned, such that said elastic tab 150 is able to deform. The rigid wall 152 positioned opposite said elastic tab 150 can advantageously be the opposing wall of said groove 153. The power supply cable or cables 20 are then held inside the groove 153 by the snap-fit attachment device or devices 15.

The present invention also concerns a method for manufacturing a sealing device 1 for the front-end air inlet of a motor vehicle, said sealing device comprising:
a supporting frame 5 comprising two longitudinal crossmembers 5a parallel to one another and two side posts 5b perpendicular to said longitudinal crossmembers 5a and connecting said longitudinal crossmembers 5a,
at least one flap 3 mounted pivotably about a pivot axis A between a sealing position and an open position, said at least one flap 3 being installed within the supporting frame 5,
at least one electric control element 13 that controls the positioning of the flap or flaps 3 and is suitable for being connected to the electric system of the motor vehicle by at least one power supply cable 20, Said manufacturing method comprises the following steps:
manufacturing the supporting frame 5, said supporting frame 5 comprising at least one snap-fit attachment device 15 for attaching the power supply cable or cables 20, said snap-fit attachment device 15 being integral with said supporting frame 5,
installing the flap or flaps 3 and the control element or elements 13 on the supporting frame 5,
connecting the power supply cable or cables 20 to the control element 13 and attaching said power supply cable or cables 20 to said snap-fit attachment devices 15.

Therefore, it can be seen that, as a result of the presence of snap-fit attachment devices 15, the sealing device 1 helps save time in the process of manufacturing said sealing device 1, and also provides good protection for the power supply cable or cables 20.

The invention claimed is:

1. A sealing device for the front-end air inlet of a motor vehicle, comprising:
a supporting frame comprising two longitudinal crossmembers parallel to one another and two side posts perpendicular to said longitudinal crossmembers and connecting said longitudinal crossmembers;
at least one flap mounted pivotably about a pivot axis between a sealing position and an open position, said at least one flap being installed within the supporting frame;
at least one electric control element that controls the positioning of the flap or flaps and is connected to the electric system of the motor vehicle by at least one power supply cable,
wherein the supporting frame comprises at least one snap-fit attachment device to which the power supply cable or cables are attached, said snap-fit attachment device being integral with said supporting frame,
wherein the at least one snap-fit attachment device is arranged on the rear face of at least one of said side posts of the supporting frame.

2. The sealing device as claimed in claim 1, wherein the at least one snap-fit attachment device is arranged on at least one of said longitudinal crossmembers of the supporting frame.

3. The sealing device as claimed in claim 2, wherein the at least one snap-fit attachment device is arranged on the lower longitudinal crossmember.

4. The sealing device as claimed in claim 1, wherein the at least one snap-fit attachment device comprises two elastic tabs positioned opposite one another and the two elastic tabs are configured to house the power supply cable or cables, the ends of said elastic tabs being separated by a distance smaller than the diameter of the power supply cable or cables so as to partially cover said power supply cable or cables.

5. The sealing device as claimed in claim 1, wherein the at least one snap-fit attachment device comprises:
   an elastic tab, and
   a rigid wall positioned opposite said elastic tab,
   said elastic tab comprising, at the end of same, a hook, said hook extending between the elastic tab and said rigid wall.

6. The sealing device as claimed in claim 5, wherein said supporting frame comprises at least one groove into which the power supply cable or cables pass.

7. The sealing device as claimed in claim 6, wherein one of the walls of the groove comprises at least one recess inside which the elastic tab is positioned, the rigid wall positioned opposite said elastic tab being the opposing wall of said groove.

8. The sealing device as claimed in claim 1, wherein the power supply cable or cables are inserted into the at least one snap-fit attachment device and connected to the at least one control element.

9. The sealing device as claimed in claim 8, wherein the power supply cable or cables are deformed when inserted into the at least one snap-fit attachment device.

10. A method for manufacturing a sealing device for the front-end air inlet of a motor vehicle, the sealing device comprising:
    a supporting frame comprising two longitudinal crossmembers parallel to one another and two side posts perpendicular to said longitudinal crossmembers and connecting said longitudinal crossmembers,
    at least one flap mounted pivotably about a pivot axis between a sealing position and an open position, said at least one flap being installed within the supporting frame, and
    at least one electric control element that controls the positioning of the flap or flaps and is suitable for being connected to the electric system of the motor vehicle by at least one power supply cable,
    said manufacturing method comprising:
    manufacturing the supporting frame, said supporting frame comprising at least one snap-fit attachment device for attaching the power supply cable or cables, said attachment device being integral with said supporting frame;
    installing the flap or flaps and the control element or elements on the supporting frame; and
    connecting the power supply cable or cables to the control elements and attaching said power supply cable or cables to said snap-fit attachment devices.

11. The manufacturing method as claimed in claim 10, wherein the supporting frame is produced from plastic material and the step of manufacturing the supporting frame is a molding step.

12. A sealing device for the front-end air inlet of a motor vehicle, comprising:
    a supporting frame comprising two longitudinal crossmembers parallel to one another and two side posts perpendicular to said longitudinal crossmembers and connecting said longitudinal crossmembers;
    at least one flap mounted pivotably about a pivot axis between a sealing position and an open position, said at least one flap being installed within the supporting frame;
    at least one electric control element that controls the positioning of the flap or flaps and is connected to the electric system of the motor vehicle by at least one power supply cable,
    wherein the supporting frame comprises at least one snap-fit attachment device to which the power supply cable or cables are attached, said snap-fit attachment device being integral with said supporting frame,
    wherein the at least one snap-fit attachment device comprises two elastic tabs positioned opposite one another and the two elastic tabs are configured to house the power supply cable or cables, the ends of said elastic tabs being separated by a distance smaller than the diameter of the power supply cable or cables so as to partially cover said power supply cable or cables.

* * * * *